(12) United States Patent
Jacobson, Jr. et al.

(10) Patent No.: US 6,317,879 B1
(45) Date of Patent: *Nov. 13, 2001

(54) METHOD AND APPARATUS FOR SYNCHRONIZING DISTRIBUTED COMPUTER SYSTEMS

(75) Inventors: James E. Jacobson, Jr., West Linn; David E. Dent, Portland, both of OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,948

(22) Filed: Dec. 11, 1997

(51) Int. Cl.$^7$ .................................................. G06F 9/445
(52) U.S. Cl. ........................... 717/11; 717/1; 717/8; 717/9; 717/10
(58) Field of Search .................. 717/11, 10, 9, 717/8, 1

(56) References Cited

U.S. PATENT DOCUMENTS

| | | | |
|---|---|---|---|
| 4,910,754 | * 3/1990 | Allen et al. | 375/108 |
| 5,452,454 | * 9/1995 | Basu | 713/2 |
| 5,579,318 | * 11/1996 | Reuss et al. | 370/94.2 |
| 5,623,604 | * 4/1997 | Russell et al. | 395/712 |
| 5,815,660 | * 9/1998 | Momona | 709/208 |
| 5,826,012 | * 10/1998 | Lettvin | 395/186 |

OTHER PUBLICATIONS

IBM Technical Disclosure Bulletin, "Use of Verifiable Virtual Memory Accesses for Inter–Processor Surveillance", vol. 40, No. 07, Jul. 1997.*

* cited by examiner

Primary Examiner—Mark R. Powell
Assistant Examiner—Ted T. Vo
(74) Attorney, Agent, or Firm—Blakely, Sokoloff, Taylor & Zafman LLP

(57) ABSTRACT

An apparatus for use in a member hardware system of a distributed collection of hardware systems includes monitor logic that cooperates with like logic of the other hardware systems to collectively monitor wellness of all hardware systems of the distributed collection of hardware systems and determine whether the hardware systems should be re-synchronized. The apparatus also includes reset logic communicatively coupled with the monitor logic that resets the member hardware system and causes the member hardware system to be rebooted off a common system image disposed in a boot one of the distributed collection of hardware systems, responsive to the monitor logic determining the hardware systems should be re-synchronized.

16 Claims, 6 Drawing Sheets

METHOD AND APPARATUS FOR SYNCHRONIZING DISTRIBUTED COMPUTER SYSTEMS

BACKGROUND OF THE INVENTION

1. Field of the Invention

The present invention pertains to the field of distributed computer systems. More particularly, this invention relates to synchronizing distributed computer systems.

2. Background

Coupling together multiple processing systems such that the systems are able to work together has become common practice. Multiple independently operated processing systems coupled together are often referred to as distributed computer or hardware systems. One example of distributed computer systems is multiple client/server computer systems coupled together in a local area network (LAN).

One problem encountered with distributed computer systems is that of modifying operating systems at each of the distributed systems. Modifications to the operating system may be done for any of a wide variety of reasons, including upgrading to a new version of the operating system, installing "patches" to correct bugs in the operating system, or user-customization. Given that multiple distributed systems may need to be modified in the same way, it would be beneficial to provide a way for making a single modification which affects each of the multiple distributed systems.

Additionally, given that each distributed system may rely on one or more of the other distributed systems for successful operation, it would be beneficial to provide a way to verify that each of the distributed systems has been booted properly.

Therefore, a need exists for a method and apparatus for synchronizing distributed computer systems.

SUMMARY OF THE INVENTION

According to one embodiment of the present invention, an apparatus for use in a member hardware system of a distributed collection of hardware systems includes monitor logic that cooperates with like logic of the other hardware systems to collectively monitor wellness of all hardware systems of the distributed collection of hardware systems and determine whether the hardware systems should be re-synchronized. The apparatus also includes reset logic communicatively coupled with the monitor logic that resets the member hardware system and causes the member hardware system to be rebooted off a common system image disposed in a boot one of the distributed collection of hardware systems, responsive to the monitor logic determining the hardware systems should be re-synchronized.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Figure 1:
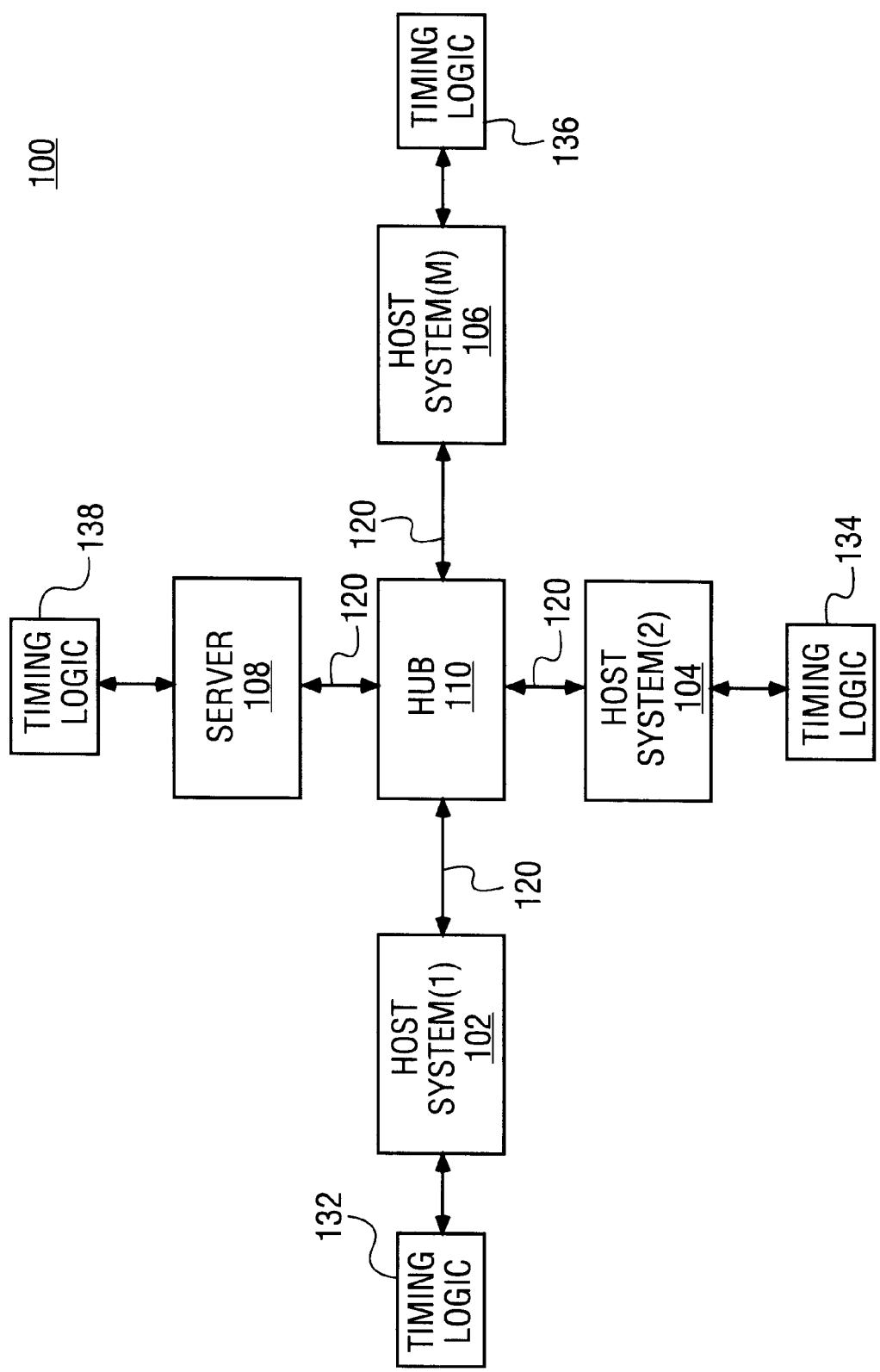
FIG. 1 is a block diagram illustrating distributed computer systems according to one embodiment of the present invention.

FIG. 1 is a block diagram illustrating distributed computer systems according to one embodiment of the present invention. A distributed collection 100 of hardware systems as illustrated includes a collection of member hardware systems including multiple (M) distributed host systems 102, 104, and 106 and server system 108. The distributed collection of hardware systems 100 is referred to as a network system. Host systems 102, 104, and 106 are directly or indirectly coupled to hub 110 via buses 120. Server system 108 is also directly or indirectly coupled to hub 110 via bus 120. In the illustrated embodiment, buses 120 include data, address and control buses (not shown), as is well known in the art.

Each host system 102, 104, and 106 includes instruction processing logic to carry out various programmed instructions and can be coupled to one or more peripheral devices (not shown). The functions of host systems 102, 104, and 106 can be varied, depending on the environment in which network system 100 is placed. In one embodiment, host systems 102, 104, and 106 can share processing of applications, share data, and control the same or different peripherals. Examples of environments into which network system 100 can be placed include single-family homes, multi-family dwellings, offices, industrial settings, toll collection facilities, and space stations. Additionally, in one embodiment, network system 100 is coupled to various electronic components in an individual residence, including one or more of the entertainment system(s), security system(s), and home automation system(s).

In the illustrated embodiment, hub 110 provides a connection for signals on buses 120, thereby enabling signals to be transmitted between any two or more of host systems 102, 104, and 106 and server 108. Any of a wide variety of conventional connection devices can be utilized for hub 110, such as an Express 10/100 Stackable Hub, available from Intel Corporation of Santa Clara, Calif. In alternate embodiments, network system 100 may not include hub 110. In one such alternate embodiment, each host system 102, 104, and 106 and server 108 is directly coupled to at least one other host system or server via a bus 120. In another such alternate embodiment, hub 110 is replaced with a switch, such as the Intel Express 10 Switch or Intel Express 10/100 Fast Ethernet Switch, both available from Intel Corporation.

In the illustrated embodiment, server 108 provides storage for both data and software applications. Each of host systems 102, 104, and 106 can read from and write to server 108. As discussed in more detail below, server 108 also provides operating system information to each of host systems 102, 104, and 106 upon reset of system 100. In alternate embodiments, additional servers are included in network system 100. However, in such alternate embodiments, one of the servers is identified as the "boot" server which provides the operating system information to each of host systems 102, 104, and 106 upon reset of system 100.

Bus 120 can be any of a wide variety of communication media and can be a combination of different types of communication media, including a network cable (e.g., a twisted pair, coaxial cable, or fiber optic cable), a conventional computer system bus, the electrical wiring of a residence (e.g., using X-10 products, available from X-10 (USA) Inc. of Closter, N.J.), or a wireless medium such as ultrasonic, infrared, or radio frequency (RF) signals. Similarly, the protocol used on bus 120 can be any of a wide variety of protocols, such as the Universal Serial Bus protocol in accordance with the Universal Serial Bus Specification, Revision 1.0, Jan. 16, 1996, available from Intel Corporation of Santa Clara, Calif., other conventional serial bus protocols, or the High Performance Serial Bus in accordance with the IEEE Standard 1394, IEEE std. 1394–1995, draft 8.0v3, approved Dec. 12, 1995.

Server 108 and host systems 102, 104, and 106 circulate a "wellness token" which is used to check whether each system 102, 104, and 106, and server 108 in network system 100 is functioning properly. Upon receipt of the wellness token, the receiving system or server checks the wellness token to verify it is correct. Upon successful verification, the system or server modifies the wellness token and forwards the modified wellness token to the next server or system. In accordance with the present invention, any of a wide range of patterns can be used for circulating the wellness token. Examples of such patterns include left to right, right to left, following a particular host/server system address or other identifier order, a high priority system to low priority system order, etc. Additionally, in one embodiment, each wellness token is encrypted, such as by following an RSA public key encryption technique, to provide a way for each of the systems 102, 104, and 106 and server 108 to verify that a wellness token allegedly provided by a particular system or server was truly broadcast by that particular system or server.

In the illustrated embodiment, each server and host system has a predetermined amount of time in which to verify, modify, and forward the wellness token. Such amounts of time typically range from a fraction of a second (e.g., 1 millisecond) to several seconds and are typically the same for each host system, although in alternate embodiments different amounts of time could be implemented for different host systems. In alternate embodiments, the predetermined amount of time in which to verify, modify, and forward the wellness token can be different, balancing the desire to detect errors within an acceptable period of time and using too much bandwidth of network system 100 with the wellness token modification, verification, and forwarding.

Thus, a total "circle" time can be calculated which identifies the maximum period of time each server and host system should have to wait before again receiving the wellness token. This maximum period of time is equal to the amount of time which each of host systems 102, 104, and 106 and server 108 can hold the wellness token plus any propagation delays within host systems 102, 104, and 106, server 108, hub 110, and buses 120. Depending on the bus protocol being used, this maximum period of time may also include an additional amount of time to account for arbitration for control of buses 120 by the host and server systems.

Host systems 102, 104, and 106 are also directly or indirectly coupled to timing logic 132, 134, and 136, respectively, and server 108 is directly or indirectly coupled to timing logic 138. In the illustrated embodiment, each host and server system resets its corresponding timing logic whenever a wellness token is received by that host or server system from the "previous" host or server system. It is to be appreciated that the "previous" host or server system is dependent on the pattern (e.g., left to right) used to circulate the wellness token. If a predetermined period of time tracked by the timing logic elapses prior to the host or server system again receiving the wellness token, then the timing logic asserts a "system configuration change" signal to the corresponding host or server system. Thus, in the illustrated embodiment, timing logic 132 asserts a system configuration change signal to host system 102 upon expiration, timing logic 134 asserts a system configuration change signal to host system 104 upon expiration, timing logic 136 asserts a system configuration change signal to host system 106 upon expiration, and timing logic 138 asserts a system configuration change signal to server system 108 upon expiration.

In the illustrated embodiment various responses can be taken upon expiration of the timing logic and assertion of a system configuration change signal. In one embodiment, each of the host and server systems are pre-programmed with multiple possible network system configurations. Thus, in this embodiment, if one or more host systems or servers malfunctions or becomes faulty, upon identification of which host and/or server system(s) are faulty, each remaining system and server can determine whether the current network system configuration can function overall. In one implementation, each host system receives these possible network system configurations from server 108. Appropriate action can then be taken by one or more host or server systems based at least in part on whether the current network system configuration can function overall.

Additionally, different system responses to the system configuration change signal can be taken based on the currently functioning host and server systems. In one implementation, each host and server system maintains a record of which other host and/or server system(s) are currently functioning. In this embodiment, each of the host and server systems are preprogrammed with one or more responses to take based on which other host and/or server system(s) are incapacitated. Examples of such responses include activation or termination of certain applications at a certain system(s) and/or server(s), activation of or transition to a higher-power mode of a particular system(s) and/or server(s), activation of or transition to a higher-power mode of a particular peripheral device(s) coupled to a system(s) and/or server(s), powering-down of or transitioning to a lower-power mode of a particular peripheral device(s), system(s), and/or server(s), resetting a particular host and/or server system(s), resetting all host and server systems in network system 100, etc.

In an alternate embodiment of the present invention a reset signal is asserted to the host and server systems rather than a system configuration change signal. This reset signal can be asserted in the same manner as the system configuration change signal. Thus, in this alternate embodiment, the network system 100 is reset upon detection of a faulty host or server system.

In the illustrated embodiment, the predetermined period of time tracked by the timing logic is equal to at least the maximum period of time the corresponding host or server system should have to wait before again receiving the wellness token from the previous host or server system. However, the predetermined period of time can be set to be greater than the maximum period of time to account for additional unforeseen delays in the circulation of the wellness token, although care should be taken to ensure that the period of time is not too long and results in system errors not being detected within an acceptable period of time.

In one embodiment of the present invention, upon receipt of a system configuration change signal from its corresponding timing logic a host system asserts a system configuration change signal on bus 120 to each of the other host and server systems. Thus, in this alternate embodiment, each of the other host and server systems is informed of a malfunctioning host or server system by the first other host or server system to identify the malfunctioning system.

In another alternate embodiment of the present invention, each of the timing logics are coupled together via an additional system configuration change signal line. In this alternate embodiment, a timing logic, upon expiration, asserts a system configuration change signal via the additional system configuration change signal line to all of the other timing logics. Upon receipt of this system configuration change signal, each of the other timing logics asserts a system configuration change signal to its corresponding host or server system.

It is to be appreciated that network system 100 is only an example of distributed computer systems which may be used with the present invention and that any of a wide range of network topologies may be used with the present invention.

In another alternate embodiment, network system 100 does not include a one to one correspondence of host systems to timing logic units as illustrated in FIG. 1. In this alternate embodiment, multiple host and/or server systems share a single timing logic rather than having separate timing logic for each host system. In one implementation, network system 100 includes a single centralized timer. It is to be appreciated that the predetermined period of time set for each of the shared timing logic units before causing assertion of a system configuration change signal is dependent on the network system topology and the location in that topology of each host system sharing the timing logic.

In another alternate embodiment of the present invention each host and server system broadcasts the wellness token to all other host and server systems and rather than just transmitting the wellness token from the previous system to the next system. Thus, in this alternate embodiment each of the other host and server systems can monitor every other host and server system in the network system 100. According to one implementation, each host and server system in network system 100 identifies for itself which other host and/or server system(s) are not functioning properly, based on the broadcast wellness tokens, and takes the appropriate response based on which other host and/or server system(s) it identifies are not functioning properly. Thus, it can be seen that in this embodiment a system or server which identifies a malfunctioning system or server need not provide a system configuration change signal to the other host and/or server system(s).

Figure 2:
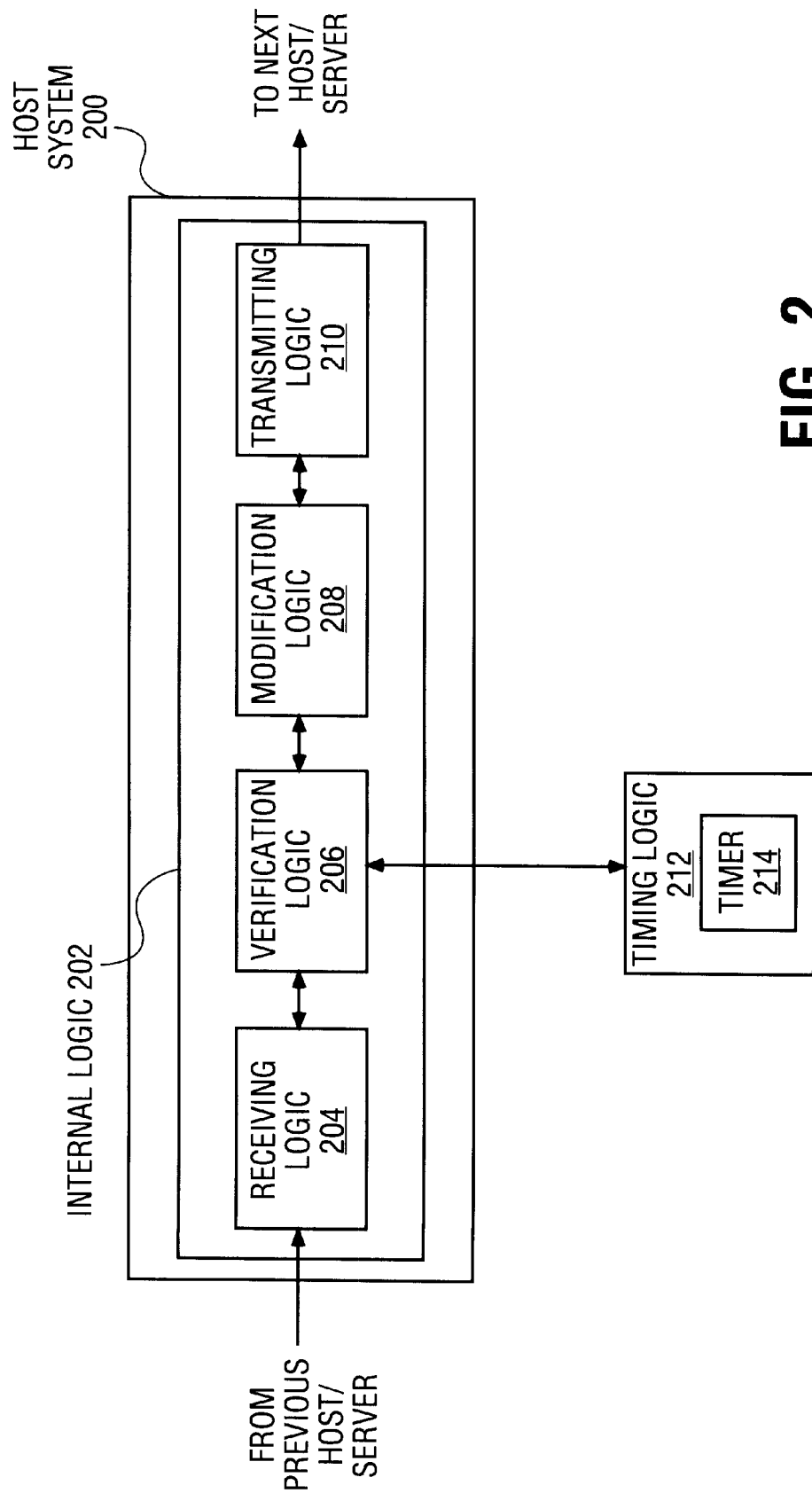
FIG. 2 is a block diagram illustrating the system architecture of a host system according to one embodiment of the present invention.

FIG. 2 is a block diagram illustrating the system architecture of a host system according to one embodiment of the present invention. Host system 200 is illustrated including internal logic 202, receiving logic 204, verification logic 206, modification logic 208, and transmitting logic 210 communicatively coupled together as illustrated. In one embodiment, each host system 102, 104, and 106 of FIG. 1 is a host system 200 of FIG. 2.

Internal logic 202 includes additional logic (not shown) which performs the principal function(s) of host system 200. It is to be appreciated that the functions provided by host system 200 are dependent on the host system itself. These functions can include internal processing capabilities, data and/or instruction storage, and input/output functions.

Receiving logic 204 receives a wellness token from the previous host or server system. Upon receipt of the wellness token, receiving logic 204 forwards the received wellness token to verification logic 206. Verification logic 206 compares the received wellness token to an expected wellness token. If the received and expected wellness tokens are the same, then verification logic 206 asserts a clear timer signal to timing logic 212. Timing logic 212 includes a counter or timer 214 which is cleared or set to a predetermined value in response to the clear timer signal from receiving logic 204. If a predetermined period of time elapses without receipt of a wellness token it is interpreted as a problem in network system 100. Therefore, when timer 214 indicates the period of time has elapsed (that is, when timer 214 expires), timing logic 212 clears timer 214 and asserts a system configuration change signal to host system 200 as discussed above.

According to one embodiment of the present invention where wellness tokens are broadcast to multiple host and/or server systems, receiving logic 204 is pre-programmed with an identifier of the previous host/server system and only forwards the received wellness token to verification logic 206 if the received wellness token is from the previous host/server system. Thus, in this embodiment, even though host and server systems are broadcasting messages to all other host and server systems, the computational effort of verifying the wellness token need not be expended by every host and server system for every broadcast wellness token.

In the illustrated embodiment, host system 200 is provided with the total number of host and server systems in network system 100 through which the wellness token will be passed. Thus, based on a predetermined pattern of modification used by each host and server system in network system 100, host system 200 can determine what the wellness token should be the next time it is received by host system 200. Alternatively, each host system 200 may simply be informed by, for example, server system 108, what wellness token it should receive. According to one embodiment, each host and server system increments the wellness token by one before passing it on. Therefore, host system 200 knows that the wellness token should have been incremented by the number of server and host systems in the distributed system before it again receives the wellness token. According to another embodiment, each host and server system increments the wellness token by one modulo "n", where n equals the number of host and server systems in the network system 100. Therefore, in this embodiment, host system 200 knows that the wellness token should be the same each time it receives the wellness token.

In one embodiment of the present invention the pattern of modification used for the wellness token varies dependent on the number of malfunctioning host or server systems in the distributed system. In one implementation, each of the host or server systems is preprogrammed with the pattern of modification for the wellness token as well as how to modify the pattern based on a newly identified malfunctioning host or server system. In an alternate implementation, each host or server system is informed of a new pattern by a server system each time a malfunctioning host or server system is identified.

If verification logic 206 determines that the received wellness token matches the expected wellness token, then verification logic 206 forwards the wellness token to modification logic 208. However, if verification logic 206 determines that the received wellness token does not match the expected wellness token, then the wellness token is not forwarded to modification logic 208 and verification logic 206 asserts an internal system configuration change signal. Thus, if host system 200 receives a wellness token other than what it is expecting, it knows that one or more host or server systems have malfunctioned and responds accordingly. As discussed above with respect to the expiration of the timing logic, the response could be any of a wide variety of functions or operations based on the currently functioning host and server system(s).

However, if the received wellness token matches the expected wellness token, then modification logic 208 modifies the wellness token according to the predetermined pattern of modification. This predetermined pattern is known by each of the host systems and the server in the distributed system and can be any of a wide variety of patterns. By way of example, the predetermined pattern may be incrementing by a specific number such as one or two, or could follow some other known algorithm. In an alternate embodiment, host system 200 is informed by, for example, server system 108 what it should modify the wellness token to.

After modifying the wellness token, internal logic 202 forwards the modified wellness token to transmitting logic 210, which in turn forwards the modified wellness token to the next host or server system.

According to another embodiment of the present invention, verification logic 206 monitors the wellness tokens from multiple "previous" host systems or servers. In this alternate embodiment, timing logic 212 includes multiple timers. A different one of the multiple timers is set for each received wellness token. Thus, in this alternate embodiment, verification logic 206 can verify whether a particular host system acted upon a received wellness token properly. By way of example, referring to FIG. 1, server 108 may broadcast a wellness token which is received by host systems 102, 104, and 106. In response to the broadcast wellness token from server 108, host system 104 sets a first timer in timing logic 134. If this first timing logic expires prior to host system 104's receipt of a wellness token from host system 102 then host system 104 knows that host system 102 is malfunctioning.

According to one embodiment of the present invention an identification of which of the host and server systems in the distributed system are currently functioning is encoded in the token itself. In this embodiment, rather than broadcasting a system configuration change signal to all of the other host and server systems, a host or server system which identifies a malfunctioning host or server system (either by receiving an invalid token or expiration of timing logic) encodes the identified malfunctioning host or server system into the token. Thus, subsequent host and server systems can identify, by checking the encoding of the token, which host or server systems are currently malfunctioning. By way of example, a bit string could be used with a different bit corresponding to each one of the host and server systems. A first value of the bit (e.g., "1") would indicate a properly functioning host or server system, while a second value of the bit (e.g., "0") would indicate a malfunctioning host or server system. By way of another example, an algorithm could be generated which uniquely identifies the different possible combinations of properly functioning host and server systems.

It should be noted that, from the perspective of any particular host or server system, the "next" host or server system may change during operation of the distributed system. These changes occur, for example, when the "current" next host or server system is malfunctioning—the particular host or server system will no longer view the malfunctioning system as the "next" system, and will instead transmit the wellness token to the subsequent host or server system (the host or server system which is one after the "current" next system). The subsequent host or server system may be identified by the particular host or server system itself upon detection of (or receiving notification of) the malfunctioning system, or alternatively a server system may simply inform the particular host or server system that the "next" host or server system, from the perspective of that particular host or server system, has changed and identify what the new "next" host or server system is.

In the illustrated embodiment, timing logic 212 is illustrated as being separate from host system 200. In alternate embodiments, timing logic 212 is part of host system 200.

In one embodiment, internal logic 202 automatically updates timing logic 212 as necessary upon modification of network system 100. In this embodiment, when the number of host systems in network system 100 changes, timing logic 212 is updated to reflect the increase or reduction in elapsed time which host system 200 should have to wait for the wellness token given the new number of host systems in network system 100. In one implementation, internal logic 202 is informed of changes in the number of host systems in network system 100 by user input or, alternatively, from server 108.

It should be noted that, by including verification logic 206 and modification logic 208 as part of internal logic 202, the present invention increases reliability by increasing its ability to detect errors in internal logic 202. In other words, if internal logic 202 begins to malfunction, then verification logic 206 and modification logic 208 will most likely provide inaccurate results, thereby causing the system 200 to be identified as malfunctioning. By not placing verification logic 206 and modification logic 208 in, for example, a network adapter card, the present invention avoids the situation where the system 200 is not identified as malfunctioning simply because the network adapter card is not malfunctioning even though the internal logic is malfunctioning. Thus, it can be seen that the wellness token is modified by a distributed system in a manner that reflects the "wellness" of that distributed system.

Figure 3:
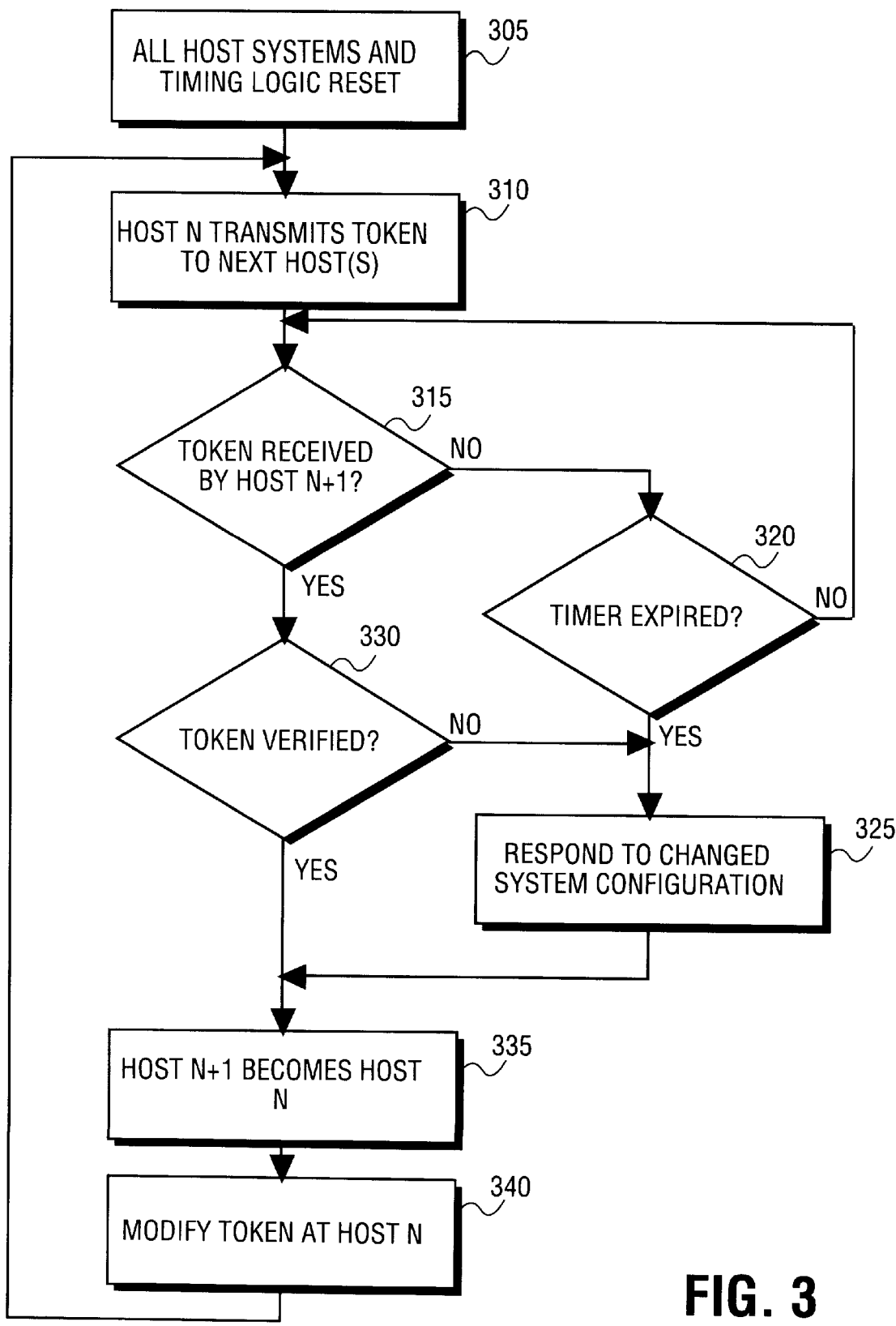
FIG. 3 is a flowchart illustrating the steps followed by a host system in receiving and transmitting a wellness token according to one embodiment of the present invention.

FIG. 3 is a flowchart illustrating the steps followed by a host system in receiving and transmitting a wellness token according to one embodiment of the present invention. In the discussion of FIG. 3 reference is made to host systems, however, it is to be appreciated that the discussion applies equally to any component of network system 100 of FIG. 1 which will be receiving and transmitting the wellness token, including host systems 102, 104, and 106, and server system 108.

Initially, all host systems and timing logic within the network system are reset, step 305. This system reset includes clearing the timers in each of the timing logic units of the network system. This occurs at, for example, system startup. After reset, a "current" host system (host system N) transmits the wellness token to the next host system (host system N+1), step 310. Alternatively, the wellness token may be broadcast to multiple systems. In the illustrated embodiment, one of host systems 102, 104, and 106 or server 108 of FIG. 1 is identified as the initial holder of the wellness token and thus the first current host system. The initial holder of the wellness token can be identified in any of a wide variety of manners, including sending a control signal to one of the host systems at reset or pre-configuring one host system to be the initial holder by using jumpers, dip switches, a memory device such as a Flash memory device, an indication from a server, etc.

Host system N+1 continues to check whether it receives the wellness token, step 315, and if not, whether its corresponding timer has expired, step 320. If the timer expires before receipt of the wellness token then the host and server systems respond to the change in the distributed system are, step 325. Host system N+1 then proceeds to pass the token to the next system, step 335. However, if the wellness token is received by host system N+1 prior to expiration of the timer, then host system N+1 proceeds to verify the wellness token, step 330. If the received wellness token is not the expected wellness token, then the host and server systems respond to the change in the distributed system, step 325.

However, if the received wellness token is the expected wellness token, then host system N+1 becomes the current host system (host system N), step 335. Host system N then modifies the wellness token, step 335, and transmits the modified wellness token to the next host (host system N+1), step 310. Host system N+1 is waiting for receipt of the wellness token, step 315, and proceeds based on whether the wellness token is received as discussed above.

Thus, following the steps illustrated in FIG. 3, the wellness token is circulated to each of the host and server systems in the distributed system.

Figure 4:
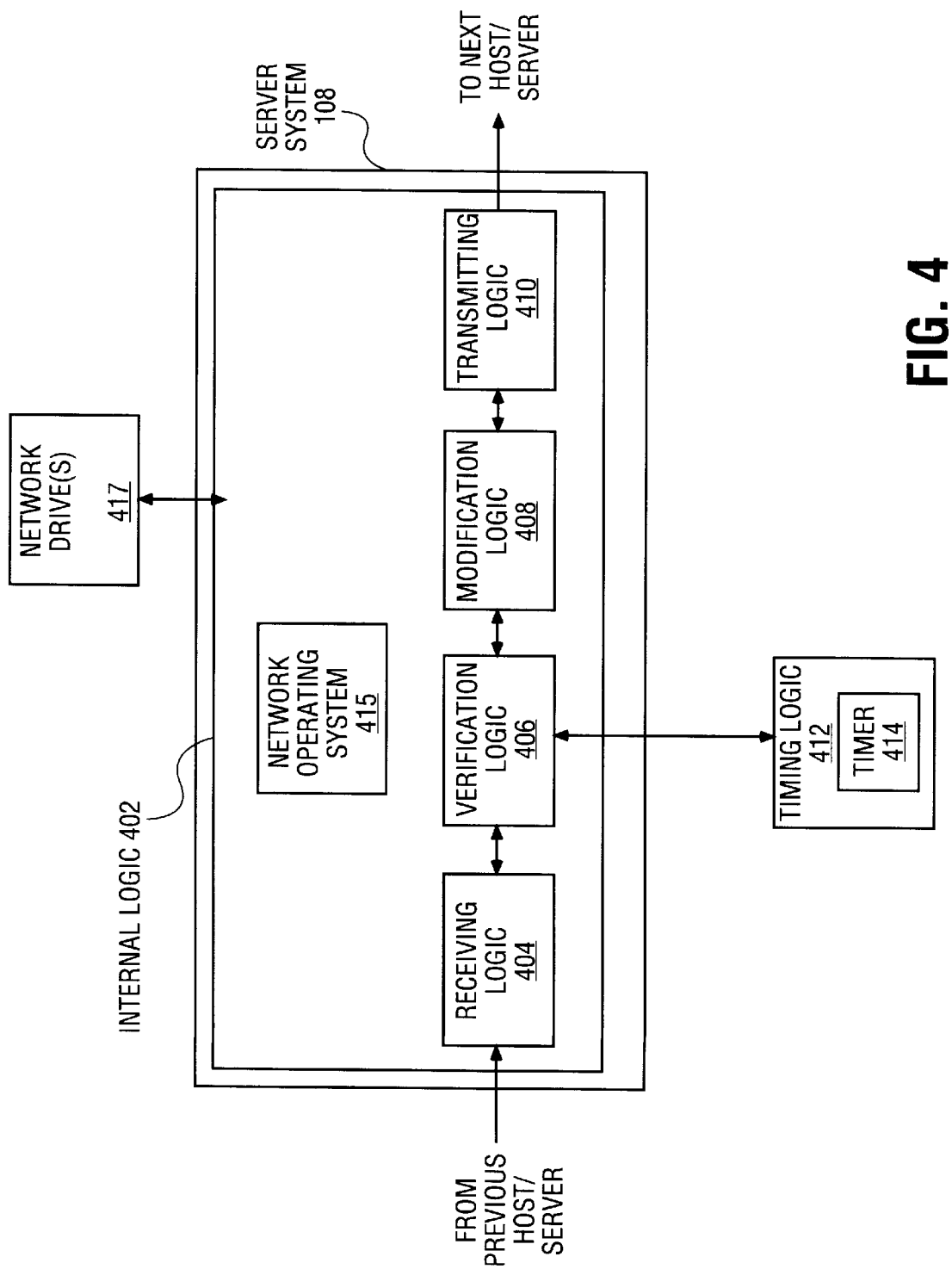
FIG. 4 is a block diagram illustrating the system architecture of a server system according to one embodiment of the present invention.

FIG. 4 is a block diagram illustrating the system architecture of a server system according to one embodiment of the present invention. Server system 108 as illustrated includes internal logic 402, receiving logic 404, verification logic 406, modification logic 408, transmitting logic 410, and network operating system 415 communicatively coupled together as illustrated. Analogous to host system 200 of FIG. 2, receiving logic 404 receives a wellness token from a host system, verification logic 406 verifies that the wellness token is correct, modification logic 408 modifies the wellness token, and transmitting logic 410 transmits the wellness token to the next host system. Timing logic 412 including timer 414 is also coupled to wellness token management logic 401 as illustrated. Timing logic 412 and timer 414 operate to assert a system configuration change signal if a predetermined period of time elapses without receipt of a wellness token in the same manner as timing logic 212 and timer 214 of FIG. 2 discussed above.

Server system 108 also includes one or more network drives 417. In the illustrated embodiment, network operating system 415 is initially stored on network drives 417 and is loaded into internal logic 402 of server 108 upon power-on or reset of server 108. In an alternate embodiment, a portion or all of network operating system 415 is stored in nonvolatile storage of server system 108, such as a read only memory (ROM), Flash memory, etc. Network drives 417 represent any of a wide variety of conventional nonvolatile storage mediums, including optical disks, removable or fixed magnetic disks, etc.

Upon reset of network system 100 control logic within each of host systems 102, 104, and 106 loads sufficient instructions and data, referred to as "basic boot information", from a local source into its system memory to allow it to access server 108. The control logic can be part of the internal logic 202 of the host system 200 of FIG. 2, or alternatively can be separate from the internal logic 202.

The local source is part of the host system and can be any of a wide variety of conventional nonvolatile storage mediums, including ROM, Flash Memory, local mass storage devices, etc. Upon loading these instructions and data, each host system 102, 104, and 106 accesses a common remote source, server 108, to obtain operating system information from system 108. The operating system information, also referred to as the "system image", includes the software code of and data for the operating system, and, in one embodiment, also includes user-specific or host system-specific preference settings. This information is transferred to the host system via bus 120. Thus, upon reset of network system 100, the host systems are re-synchronized from the common system image.

In one embodiment of the present invention, each host system 102, 104, and 106 obtains the same operating system information from server 108. Thus, in this embodiment each host system 102, 104, and 106 is initialized to a common and known state. In an alternate embodiment of the present invention, different host systems 102, 104, and 106 can obtain different operating system information from server 108. By way of example, one host system may obtain instructions and data for the Windows™ 95 operating system which causes the host system to initialize to a Windows™ 95 game system environment, whereas another host system may obtain instructions and data for the Windows™ NT operating system which causes the host system to initialize to a Windows™ NT business system environment. In one implementation, a host system is preprogrammed with an indication of which operating system information it should obtain from server 108 and identifies these portions to server 108 for transfer. In an alternate implementation, server 108 rather than the host system is preprogrammed with an indication of which operating system information it should obtain from server 108. Thus, in this alternate implementation, a host system need merely identify itself to server 108, which in turn transfers the appropriate operating system information to the host system.

In the illustrated embodiment, the operating system information provided to host systems 102, 104, and 106 by server system 108 is stored in network drive 417. When accessed by one of host systems 102, 104, or 106, server system 108 obtains the appropriate operating system information from network drive 417 and transfers it to the accessing host system via bus 120.

Network operating system 415 also performs a check to verify that operating systems for each of host systems 102, 104, and 106 have been successfully loaded. In the illustrated embodiment, network operating system 415 polls each of host systems 102, 104, and 106 after network operating system 415 believes the host system has obtained its operating system information. In one embodiment, the polling process comprises sending a message to each of the host systems and checking whether the appropriate response message is received The operating system of each host system 102, 104, and 106, upon receipt of a polling message from server system 108, returns a predetermined response to server 108 if the operating system is operating properly. If server system 108 does not receive the proper response from a host system 102, 104, or 106 within a predetermined period of time, then server 108, believing the host system is malfunctioning, resets network system 100. In an alternate embodiment, rather than resetting the entire system 100, server 108 resets only the host system which it believes is malfunctioning.

In one implementation, a system verification application is received as part of the operating system information from server 108 and is executed by the operating system of host systems 102, 104, and 106 upon loading and executing of the operating system information. This system verification application performs various checks of the operating system of the host system and, if no malfunctions are detected, responds to network operating system 415, upon being polled, that the host system is functioning properly.

In the illustrated embodiment, server system 108 resets network system 100 by asserting a reset signal on a reset signal line of bus 120. In an alternate embodiment, server system 108 resets network system 100 via timing logic 138. In this alternate embodiment, timing logics 132, 134, 136, and 138 are interconnected via a reset signal line. Thus, in order to reset network system 100, server system 108 indicates to timing logic 138 to assert a reset signal to the other timing logics, which in turn assert a reset signal to their corresponding host systems.

Figure 5:
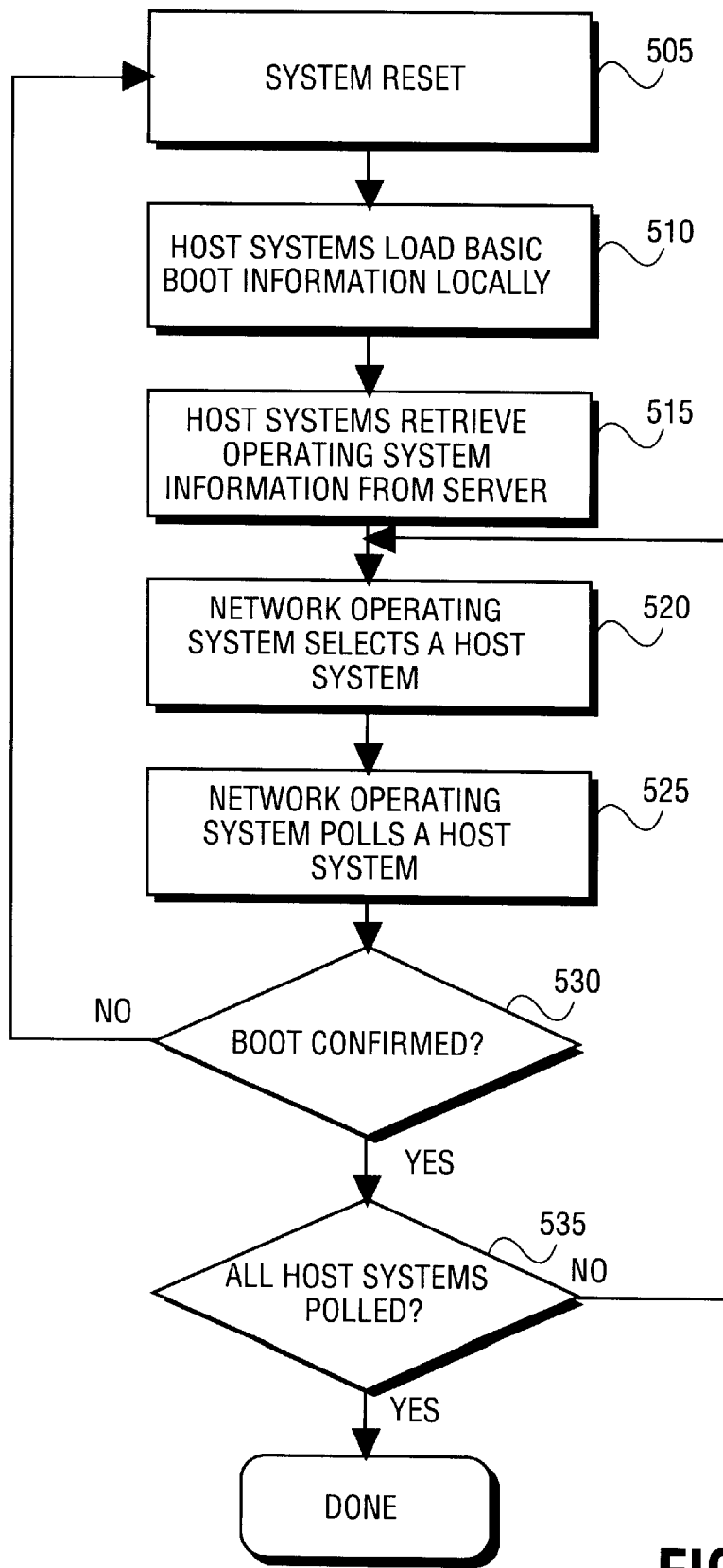
FIG. 5 is a flow chart illustrating the steps followed in initializing distributed computer systems according to one embodiment of the present invention.

FIG. 5 is a flowchart illustrating the steps followed in initializing distributed computer systems according to one embodiment of the present invention. The distributed system is first reset, step 505. This reset can be initiated in any of a wide variety of manners, including both expiration of timing logic as discussed above and powering-on of the host systems and server. Each host system, upon being reset, loads basic boot information locally, step 510. This basic boot information is a small amount of instructions and/or data which allows the host system to access server system 108. Each host system then retrieves operating system information from a common remote source (server 108), step 515. This information is transferred from server 108 to the host systems via the bus and is stored locally by the host systems. Alternatively, rather than each host system initiating transfer of the operating system information in step 515, network operating system 415 initiates the transfer.

Network operating system 415 of server system 108 then selects a host system, step 520, and polls the host system, step 525, to verify that the system has been booted up properly. Network operating system 415 checks whether the polling confirms successful booting of the selected system, step 530. If the boot is not confirmed, then the network system 100 is reset, step 505. However, if the boot is confirmed, then network operating system 415 checks whether all host systems in the distributed system have been polled, step 535. If all host systems have not been polled, then network operating system 415 returns to select another host system, step 520. When confirmation of successful booting of all host systems has been obtained, the initialization process is finished until another system reset occurs.

In an alternate embodiment of the present invention, instructions and/or data in addition to the operating system are transferred to one or more host systems from the server. In this alternate embodiment certain data files or software application programs are also transferred to the host system (s) for use at the host system. Thus, in this alternate embodiment no additional nonvolatile storage is necessary at the host systems, as all necessary instructions and data can be transferred to the host system from the server system.

In the illustrated embodiment, network operating system 415 polls the host systems after all host systems have obtained their operating system information. In an alternate embodiment, network operating system 415 does not wait for all host systems to obtain their operating system information. In this alternate embodiment, as soon as at least one host system has obtained its operating system information, network operating system 415 begins polling. However, in one implementation, network operating system 415 selects a host system for polling only after network operating system 415 believes the host system has obtained its operating system information.

Figure 6:
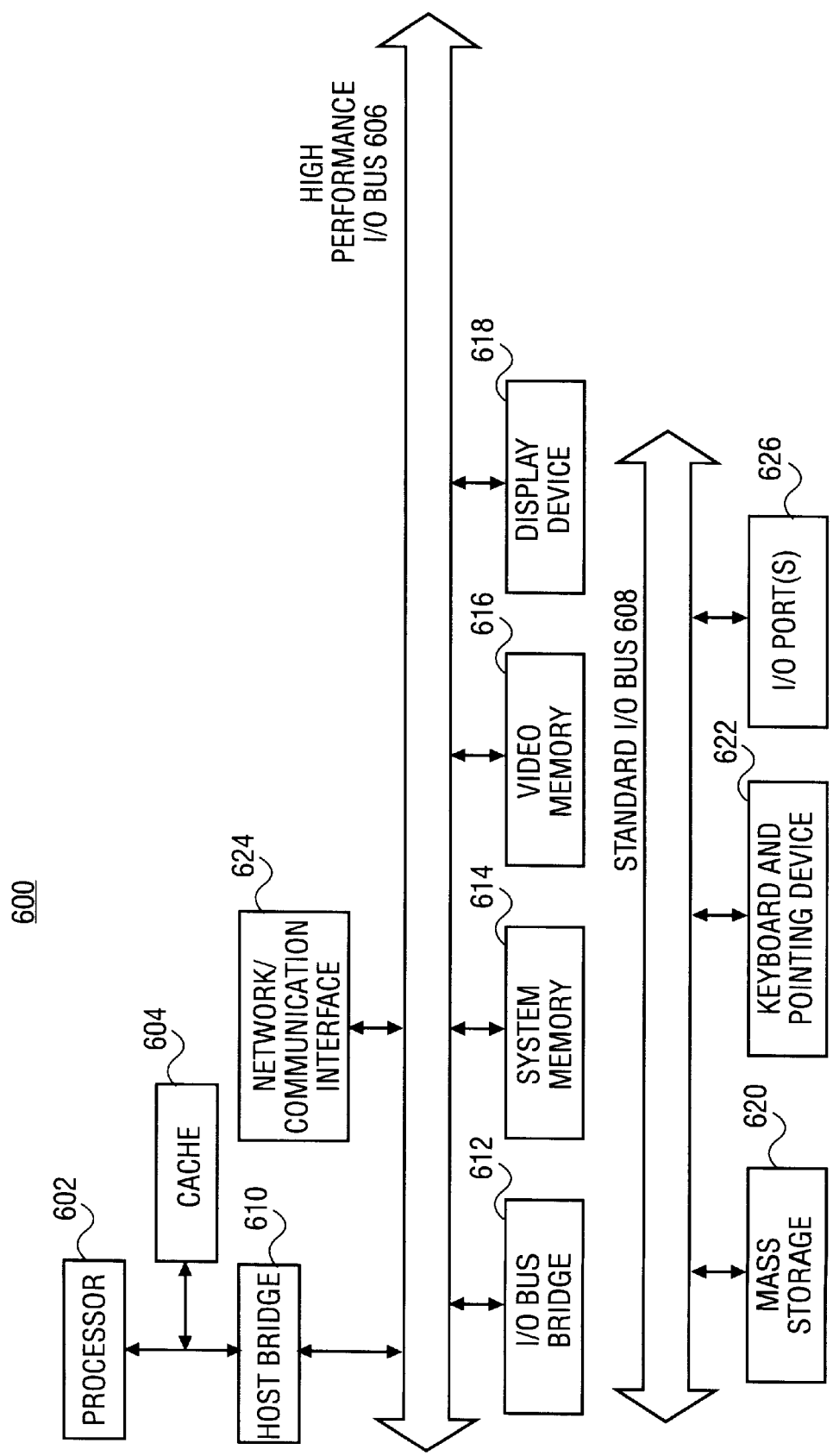
FIG. 6 illustrates a hardware system or machine suitable for use as a host or server system according to one embodiment of the present invention.

FIG. 6 illustrates a hardware system or machine suitable for use as a host or server system according to one embodiment of the present invention. In one embodiment, host systems 102, 104, and 106, as well as server system 108 illustrated in FIG. 1 are each a hardware system 600 of FIG. 6. In the illustrated embodiment, hardware system 600 includes processor 602 and cache memory 604 coupled to each other as shown. Additionally, hardware system 600 includes high performance input/output (I/O) bus 606 and standard I/O bus 608. Host bridge 610 couples processor 602 to high performance I/O bus 606, whereas I/O bus bridge 612 couples the two buses 606 and 608 to each other. Coupled to bus 606 are network/communication interface 624, system memory 614, and video memory 616. In turn, display device 618 is coupled to video memory 616. Coupled to bus 608 is mass storage 620, keyboard and pointing device 622, and I/O ports 626. Collectively, these elements are intended to represent a broad category of hardware systems, including but not limited to general purpose computer systems based on the Pentium® processor, Pentium® Pro processor, or Pentium® II processor manufactured by Intel Corporation of Santa Clara, Calif.

These elements 602–626 perform their conventional functions known in the art.

In particular, network/communication interface 624 is used to provide communication between system 600 and any of a wide range of conventional networks, such as an Ethernet, token ring, the Internet, etc. It is to be appreciated that the circuitry of interface 624 is dependent on the type of network the system 600 is being coupled to. In one implementation, hardware system 600 is coupled to bus 120 of FIG. 1 via network/communication interface 624.

Mass storage 620 is used to provide permanent storage for the data and programming instructions to perform the above described functions of wellness token management logic 201 of FIG. 2, whereas system memory 614 is used to provide temporary storage for the data and programming instructions when executed by processor 602.

I/O ports 626 are one or more serial and/or parallel communication ports used to provide communication between additional peripheral devices which may be coupled to hardware system 600.

It is to be appreciated that various components of hardware system 600 may be rearranged. For example, cache 604 may be on-chip with processor 602. Alternatively, cache 604 and processor 602 may be packaged together as a "processor module" and attached to a "processor card", with processor 602 being referred to as the "processor core". Furthermore, certain implementations of the present invention may not require nor include all of the above components. For example, mass storage 620, keyboard and pointing device 622, and/or display device 618 and video memory 616 may not be included in system 600. Additionally, the peripheral devices shown coupled to standard I/O bus 608 may be coupled to high performance I/O bus 606; in addition, in some implementations only a single bus may exist with the components of hardware system 600 being coupled to the single bus. Furthermore, additional components may be included in system 600, such as additional processors, storage devices, or memories.

In alternate embodiments of the present invention, hardware system 600 is less complex than illustrated. By way of example, processor 602, system memory 614, and network/ communication interface 624 could be implemented in a microcontroller or an application specific integrated circuit (ASIC).

FIG. 6 is intended to represent a wide range of conventional hardware systems which could be part of a distributed system. Examples of such systems include home or business computers, Internet appliances, audio/video (e.g., home theater) controllers, security systems, etc.

In one embodiment, internal logic 202 of FIG. 2 and internal logic 402 of FIG. 4 are implemented as a series of software routines run by a hardware system 600 of FIG. 6. These software routines comprise a plurality or series of instructions to be executed by a processor in a hardware system, such as processor 602 of FIG. 6. Initially, the series of instructions are stored on a storage device, such as mass storage 620. It is to be appreciated that the series of instructions can be stored on any conventional storage medium, such as a diskette, CD-ROM, magnetic tape, DVD (DVD is currently used as an acronym for digital video disk. However, it appears that the usage is being changed to digital versatile disk to reflect the ability of DVD technology to be used for data other than video), laser disk, ROM, etc. It is also to be appreciated that the series of instructions need not be stored locally, and could be received from a remote storage device, such as a server on a network, via network/communication interface 624.

The instructions are copied from the storage device, such as mass storage 620, into memory 614 and then accessed and executed by processor 602. In one implementation, these software routines are written in the C++ programming language. It is to be appreciated, however, that these routines may be implemented in any of a wide variety of programming languages. Thus, it can be seen that the wellness token can only be verified and modified correctly if processor 602, cache 604, host bridge 610, bus 605, and system memory 614, as well as possibly additional devices, of hardware system 600 are functioning properly. Over time, failure by any of these components will most likely cause a failure in the verification and modification of the wellness tokens, thereby allowing performance of system 600 to be verified as opposed to, for example, simply network/communication interface 624.

In alternate embodiments, the present invention is implemented in discrete hardware or firmware. For example, in one alternate embodiment, an ASIC is programmed with the above described functions of the present invention.

Thus, the present invention advantageously provides for synchronizing distributed computer systems. Each of multiple distributed systems advantageously obtains its operating system information from a common server. Thus, changes to the operating system information can be made by a user at a single location (that is, the server), without requiring the user to access each of the distributed systems individually.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. An apparatus for use in a member hardware system of a distributed collection of hardware systems, the apparatus comprising:

a monitor logic to cooperate with corresponding monitor logic of other hardware systems, to monitor collectively operability of all hardware systems of the distributed collection of hardware systems by monitoring a passing of a token having a pattern contained therein between said hardware systems, to determine whether the hardware systems should be reset based on the pattern within the passed token, to modify the pattern within the passed token if a malfunction is identified, and if the pattern within the passed token is modified to pass the modified token to another hardware system; and a reset logic communicatively coupled with and responsive to the monitor logic and to reset the member hardware system and to cause the member hardware system to reboot off a system image disposed in a boot-member of the distributed collection of hardware systems, wherein said member hardware system and boot-member are communicatively coupled over a communication link, said communication link being used to transfer said system image from the boot-member to said member hardware system for said reboot.

2. The apparatus of claim 1, further comprising:

internal logic communicatively coupled with the reset logic and to receive a polling message from the boot-member and to indicate to the boot-member, in response to the polling message, whether the member hardware system has been successfully rebooted.

3. The apparatus of claim 1, wherein plural different boot images are disposed in the boot-member; and wherein the reset logic of each member hardware system is to cause such member system to be rebooted off one of the plural boot images.

4. The apparatus of claim 1, further comprising:

a verifier logic, communicatively coupled with the monitor logic, and to verify operability of an operating system of the member hardware system after rebooting the member hardware system off the common system image.

5. A method for monitoring members of a distributed collection of hardware systems, the method comprising:

monitoring, in cooperation with the other hardware systems, the operability of all hardware systems of the distributed collection of hardware systems by monitoring a passing of a token between said hardware systems, the token having a pattern contained therein;

determining, based on the pattern within the passed token, whether the hardware systems is to be reset;

modifying the pattern within the passed token if a malfunction is identified;

if the pattern within the passed token is modified, passing the modified token to another hardware system; and rebooting a member hardware system off a common system image disposed in a boot-member of the distributed collection of hardware systems in response to a determination that the hardware systems should be reset, wherein said member hardware system and boot-member are communicatively coupled over a communication link, said communication link being used to transfer said system image from the boot-member to said member hardware system for said reboot.

6. The method of claim 5, further comprising:

receiving a polling message from the boot-member of the distributed collection of hardware systems; and indicating to the boot-member of the distributed collection of hardware systems, in response to the polling message, whether the member hardware system has been successfully rebooted.

7. The method of claim 5, further comprising:

rebooting different member hardware systems of the distributed collection of hardware systems off different common system images disposed in the boot-member of the distributed collection of hardware systems.

8. The method of claim 5, further comprising:

verifying operability of an operating system of the member hardware system after rebooting the member hardware system off the common system image.

9. A machine-readable storage medium having stored therein a plurality of programming instructions for use by a member hardware system of a distributed collection of hardware systems for:

monitoring, in cooperation with the other hardware systems, the operability of all hardware systems of the distributed collection of hardware systems by monitoring a passing of a token between said hardware systems, the token having a pattern contained therein;

determining, based on the pattern within the passed token, whether the hardware systems should be reset;

modifying the pattern within the passed token if a malfunction is identified;

if the pattern within the passed token is modified, to pass the modified token to another hardware system; and rebooting the member hardware system off a common system image disposed in a boot-member of the distributed collection of hardware systems in response to a determination that the hardware systems is to be reset, wherein said member hardware system and boot-member are communicatively coupled over a communication link, said communication link being used to transfer said system image from the boot-member to said member hardware system for said reboot.

10. The machine-readable storage medium of claim 9, wherein the plurality of programming instructions further include instructions for:

receiving a polling message from the boot-member of the distributed collection of hardware systems; and indicating to the boot-member of the distributed collection of hardware systems, in response to the polling message, whether the member hardware system has been successfully rebooted.

11. The machine-readable storage medium of claim 9, wherein the plurality of programming instructions further include instructions for:

rebooting different member hardware systems of the distributed collection of hardware systems off different common system images disposed in the boot-member of the distributed collection of hardware systems.

12. The machine-readable storage medium of claim 9, the plurality of programming instructions further including instructions for:

verifying operability of an operating system of the member hardware system after rebooting the member hardware system off the common system image.

13. An apparatus for use in a member hardware system of a distributed collection of hardware systems, the apparatus comprising:

a monitoring means for cooperating with corresponding monitoring arrangements of other hardware systems, for collectively monitoring operability of all hardware systems of the distributed collection of hardware systems by monitoring a passing of a token having a pattern contained therein between said hardware systems, and for determining whether the hardware systems is to be reset based on the pattern within the passed token, for modifying the pattern within the passed token if a malfunction is identified, and if the pattern within the passed token is modified for passing the modified token to another hardware system; and a reset means, communicatively coupled with and responsive to the monitoring means, and for resetting the member hardware system and for causing the member hardware system to be rebooted off a common system image disposed in a boot-member of the distributed collection of hardware systems, wherein said member hardware system and boot-member are communicatively coupled over a communication link, said communication link being used to transfer said system image from the boot-member to said member hardware system for said reboot.

14. The apparatus of claim 13, further comprising:

receiving means, communicatively coupled with the reset means, and for receiving a polling message from the boot-member of the distributed collection of hardware systems and for indicating to the boot-member, in response to the polling message, whether the member hardware system has been successfully rebooted.

15. The apparatus of claim 13, wherein the reset means for each member hardware system of the distributed collection of hardware systems if for causing each such member system to be rebooted off different common system images disposed in the boot-member of the distributed collection of hardware systems.

16. The apparatus of claim 13, further comprising:

a verifier means,
communicatively coupled with the monitor logic, for verifying operability of an operating system of the member hardware system after rebooting the member hardware system off the common system image.

* * * * *